United States Patent
Hasuo et al.

(10) Patent No.: US 11,367,576 B2
(45) Date of Patent: Jun. 21, 2022

(54) ELECTRODE FOR POWER STORAGE DEVICES AND METHOD OF MANUFACTURING THE SAME

(71) Applicant: Charles Metallic & Solar Materials Co., Ltd., Tortola (VG)

(72) Inventors: Shunji Hasuo, Fukuoka (JP); Tatsumi Ishihara, Fukuoka (JP)

(73) Assignee: Charles Metallic & Solar Materials Co., Ltd., Tortola (VG)

( * ) Notice: Subject to any disclaimer, the term of this patent is extended or adjusted under 35 U.S.C. 154(b) by 76 days.

(21) Appl. No.: 16/445,393

(22) Filed: Jun. 19, 2019

(65) Prior Publication Data

US 2019/0304709 A1  Oct. 3, 2019

Related U.S. Application Data

(63) Continuation of application No. PCT/IB2017/058110, filed on Dec. 19, 2017.

(30) Foreign Application Priority Data

Dec. 22, 2016  (JP) .............................. JP2016-249763

(51) Int. Cl.
| | |
|---|---|
| *H01G 11/24* | (2013.01) |
| *H01G 11/06* | (2013.01) |
| *H01G 11/68* | (2013.01) |
| *H01G 11/70* | (2013.01) |
| *H01G 11/86* | (2013.01) |
| *H01M 4/139* | (2010.01) |

(Continued)

(52) U.S. Cl.
CPC ............ *H01G 11/24* (2013.01); *H01G 11/06* (2013.01); *H01G 11/68* (2013.01); *H01G 11/70* (2013.01); *H01G 11/86* (2013.01); *H01M 4/13* (2013.01); *H01M 4/139* (2013.01); *H01M 4/62* (2013.01); *H01M 4/66* (2013.01); *H01M 4/80* (2013.01); *Y02E 60/13* (2013.01)

(58) Field of Classification Search
None
See application file for complete search history.

(56) References Cited

U.S. PATENT DOCUMENTS

2013/0309570 A1   11/2013 Kim et al.

FOREIGN PATENT DOCUMENTS

| JP | S61-59716 | 3/1986 |
|---|---|---|
| JP | 06267542 A  * | 9/1994 |

(Continued)

OTHER PUBLICATIONS

Extended European Search Report dated Nov. 26, 2019 for Application No. 17883809.0.

(Continued)

*Primary Examiner* — Daniel S Gatewood
(74) *Attorney, Agent, or Firm* — BainwoodHuang (57) ABSTRACT

An electrode for a power storage device includes a non-woven fabric current collector that comprises short fibers of aluminum or copper having an average length of 25 mm or less; and adsorbent material powder on which electrolyte ions are adsorbed during charging or active material powder which chemically react during charging and discharging, where the powder exists in the gaps formed between the short fibers of the non-woven fabric current collector.

14 Claims, 7 Drawing Sheets

(51) Int. Cl.
  *H01M 4/62* (2006.01)
  *H01M 4/66* (2006.01)
  *H01M 4/80* (2006.01)
  *H01M 4/13* (2010.01)

(56) References Cited

FOREIGN PATENT DOCUMENTS

| JP | H06-267542 | | | 9/1994 | | |
|---|---|---|---|---|---|---|
| JP | 09143510 | A | * | 6/1997 | ............. | H01M 4/80 |
| JP | H09-143510 | | | 6/1997 | | |
| JP | H09143510 | | | 6/1997 | | |
| JP | H10284055 | | | 10/1998 | | |
| JP | 11312523 | A | * | 11/1999 | | |
| JP | H11-312523 | | | 11/1999 | | |
| JP | 2000167721 | | | 6/2000 | | |
| JP | 2005086113 | | | 3/2005 | | |
| JP | 2007123156 | | | 5/2007 | | |
| JP | 200959654 | | | 3/2009 | | |
| JP | 2009151960 | | | 7/2009 | | |
| JP | 2009151960 | A | * | 7/2009 | | |
| JP | 2009224623 | | | 10/2009 | | |
| JP | 2011-154955 | | | 8/2011 | | |
| JP | 2012230887 | | | 11/2012 | | |
| JP | 201326444 | | | 2/2013 | | |
| JP | 2013127872 | | | 6/2013 | | |
| JP | 201496238 | | | 5/2014 | | |
| JP | 2014191919 | | | 10/2014 | | |
| JP | 2014191919 | A | * | 10/2014 | | |
| JP | 2014238944 | | | 12/2014 | | |
| JP | 2014238944 | A | * | 12/2014 | | |
| WO | 2011148970 | | | 1/2011 | | |

OTHER PUBLICATIONS

Kogi Corporation, "KC Metal Fiber (Metal staple fiber)", retrieved from the Internet Jun. 5, 2019, URL: http://www.kogi.cojp/bumon_sinsozai_metal.html. Rainbow Technology Co., Ltd—Functional Materials Division, published date unknown.

Tokyo Rope Mfg. Co., Ltd., "Metal fiber/Metal staple fiber", Retrieved from the Internet Jun. 5, 2019. URL: https://www.tokyorope.cojp/product/eg/metal_fiber, published date unknown.

"Aspiration and joy to practical use—hand down academia collaboration of Showa, Two new production methods of metal staple fiber", Industry-academia-government collaboration Journal, Feb. 2010 Issue, Japan Science and Technology Agency (JST), Retrieved from the Internet. URL: https://sangakukan.jst.go.jp/journal/journal_contents/2010/02/articles/1002-02-4/1002-02-4_article.html.

Japanese Notice of Reasons for Refusal for application No. JP.2016249763.A, dated Aug. 6, 2019.

Japanese Notice of Reasons for Refusal, Application No. JP.2019220270.A, dated Jan. 5, 2021.

\* cited by examiner

ELECTRODE FOR POWER STORAGE DEVICES AND METHOD OF MANUFACTURING THE SAME

CROSS-REFERENCE TO RELATED APPLICATIONS

This application is based on and claims priority to Japanese Patent Application No. 2016-249763 filed on Dec. 22, 2016, the entire content of which is incorporated herein by reference. This application is based on International Patent Application No. PCT/IB2017/058110 filed on Dec. 19, 2017, the entire content of which is incorporated herein by reference.

TECHNICAL FIELD

The present invention relates to an electrode for power storage devices such as a rechargeable battery, a capacitor, etc. and relates to a method of manufacturing the electrode.

BACKGROUND

Capacitors and secondary batteries are used in various fields for reduction of energy consumption, prevention of global warming, and other purposes. In particular, as electrical energy has been employed in the automobile industry, development of technology for utilizing them has been accelerated.

An electric double layer capacitor has been conventionally used for backup purposes for memory devices of electronic circuits to which a low voltage is applied, and has enhanced input/output reliability as compared with a rechargeable battery.

For this reason, in recent years, electric double layer capacitors are used for power generation utilizing natural energy such as solar light and force of wind, as well as for construction machines, power supplies for momentary voltage drop, and regenerative power supplies for trains, etc. Although implementation of electric double layer capacitors has also been considered in the context of automobile applications, their characteristics and costs do not meet the requirements and implementation thereof in this field was not realized until recently. However, at present, electric double layer capacitors are used for electronically controlled brake systems, and applications to backup power supplies for automobile electrical components and energy supplies for starting idling stop systems, brake control, power assistance, etc. have been studied.

With regard to the structure of an electric double layer capacitor, an electric double layer capacitor includes positive and negative electrode parts, an electrolytic solution, and a separator for preventing a short circuit between the positive and negative electrode parts opposed to each other. The electrode part is made by applying, on aluminum foil (thickness of about 20 µm) as a current collector, multiple layers of a kneaded mixture obtained by kneading a polarizable electrode (currently, mainly activated carbon), a binder for holding activated carbon, and a conductive additive (mainly particles of carbon). Such an electric double layer capacitor is disclosed, for example, in the patent literature PTL 1.

Charging of the electric double layer capacitor is performed through the movement of electrolyte ions in the solution and their adsorption and desorption on the surface with fine pores of the activated carbon. The electric double layer capacitor is formed at the interface where the activated carbon powder and the electrolytic solution are in contact with each other.

In this context, the particle diameter of ordinary activated carbon is, for example, about 4 to 8 µm, and the specific surface area thereof is, for example, 1600 to 2500 $m^2/g$. The electrolytic solution has a cation, an anion and a solvent, where tetraethyl ammonium salt may be used as the cation, tetrafluoride borate ion may be used as the anion, and propylene carbonate and ethylene carbonate may be used as the solvent.

Figure 8:
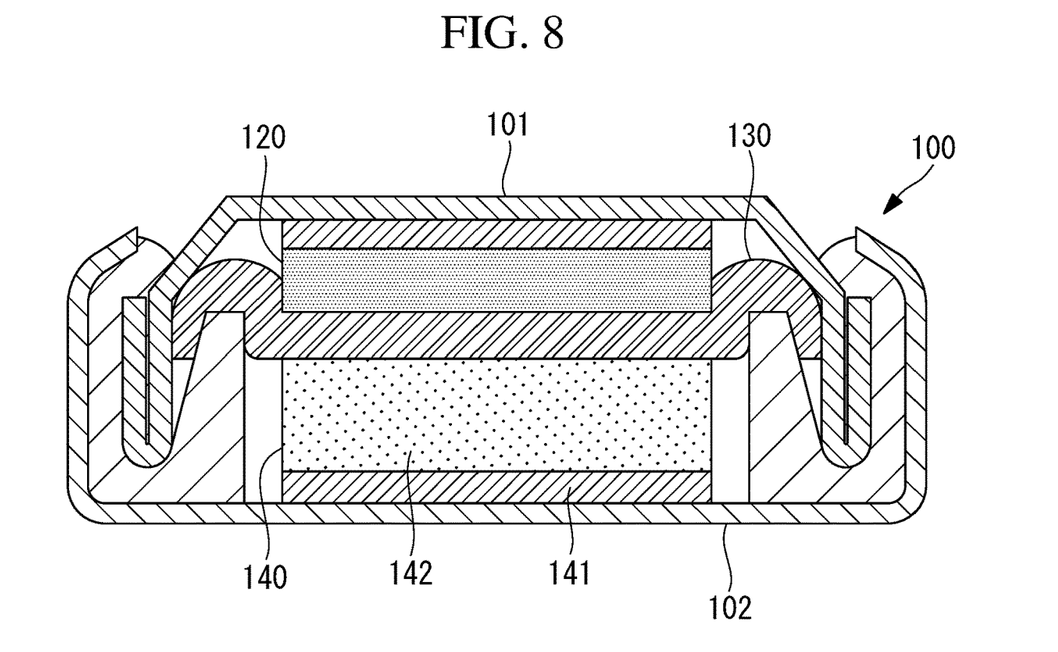
FIG. 8 is a cross-sectional view of a conventional coin-type rechargeable battery.

On the other hand, lithium ion secondary batteries are mainly composed of a positive electrode, a negative electrode, and a separator. For example, as shown in FIG. 8, generally, the positive electrode is obtained by applying, with a thickness in the order of 100 µm, a kneaded mixture of active material powder (usually lithium cobaltate), a conductive additive which is an additive substance, and a binder on aluminum foil with a thickness of 20 µm as a current collector. Also, the negative electrode is obtained by applying a carbon material onto copper foil as a current collector. A lithium ion rechargeable battery is configured by separating these electrodes by a separator such as polyethylene and immersing them in an electrolytic solution. Such a lithium ion rechargeable battery is disclosed, for example, in the patent literature PTL 2.

Charging and discharging are performed through movement of lithium ions between the positive electrode and the negative electrode and, during the charging, the lithium ions move from the positive electrode to the negative electrode and the charging is completed when the lithium ions in the positive electrode disappear or lithium ions cannot be stored anymore in the negative electrode. The opposite phenomenon will be observed during the discharging.

CITATION LIST

Patent Literature

{PTL 1} Japanese Unexamined Patent Application, Publication No. 2005-086113
{PTL 2} Japanese Unexamined Patent Application, Publication No. 2007-123156

SUMMARY OF INVENTION

A method of manufacturing an electrode of an power storage device in accordance with a first aspect of the present invention includes creating a liquid or gel slurry, the slurry containing short fibers of aluminum or copper, adsorbent material powder on which electrolyte ions are adsorbed during charging or active material powder which chemically reacts during charging or discharging, and a binder; forming the slurry into a predetermined shape; and drying the slurry formed into the predetermined shape so as to form an electrode in which the short fibers of aluminum or copper functions as a current collector.

An electrode of a power storage device in accordance with a second aspect of the present invention includes a non-woven fabric current collector composed of short fibers of aluminum or copper with an average length of 25 mm or less and adsorbent material powder on which electrolyte ions adsorb during charging or active material powder which chemically reacts during charging or discharging, the powder entering gaps formed between the short fibers of the aluminum or copper of the non-woven fabric current collector.

DETAILED DESCRIPTION

An electrode in accordance with an embodiment of the present invention will be described below with reference to the drawings.

Figure 1:
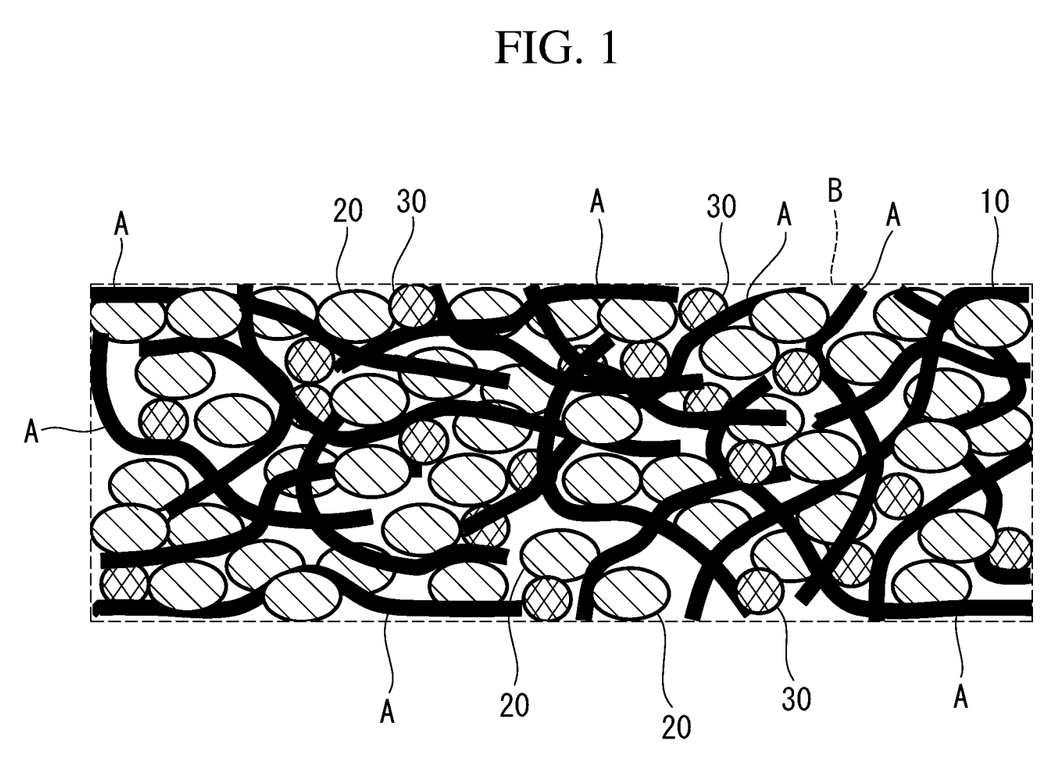
FIG. 1 is a cross-sectional diagram of an electrode in accordance with an embodiment of the present invention.
Figure 2:
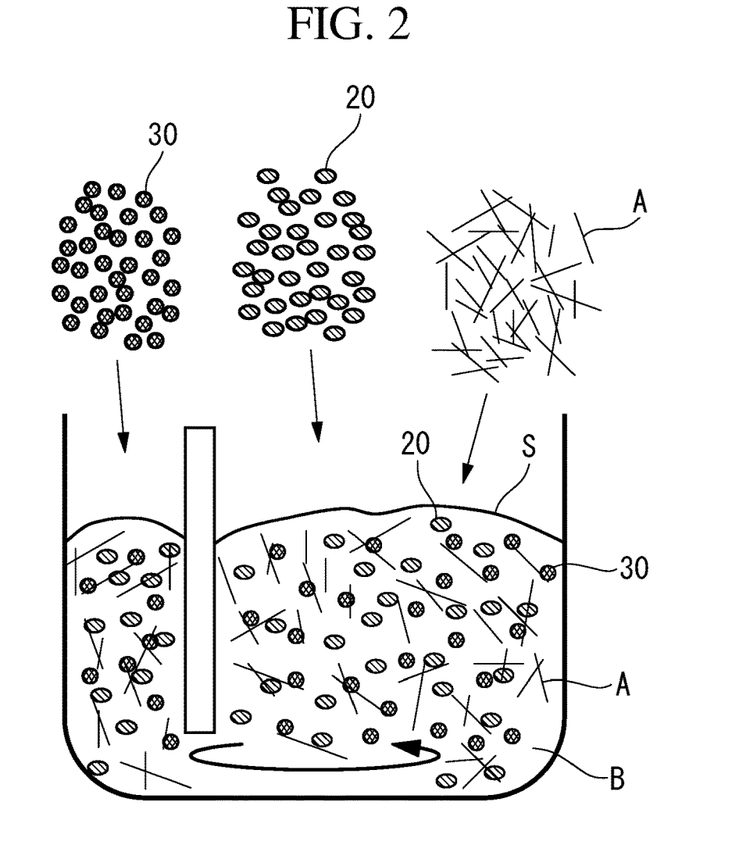
FIG. 2 is a schematic diagram of a method of producing a slurry in accordance with this embodiment.

The electrode includes, as illustrated in FIG. 1, a non-woven fabric current collector 10 composed of short fibers A of aluminum or copper with an average diameter of 100 μm or less, and active material powder 20 retained in the non-woven fabric current collector 10 by a binder B so that it chemically reacts during charging and discharging, and includes, as required, a conductive additive 30 retained in the non-woven fabric current collector 10 by the binder B.

It should be noted that FIG. 1 is a diagram illustrating a configuration of this embodiment in a readily understandable manner in which the sizes, thicknesses, and lengths of the short fibers A, the active material powder 20, the conductive additive 30, carbon fibers CF, and the like may differ from those of the actual ones. Also, in FIG. 1, it is also possible to make the non-woven fabric current collector 10 retain adsorbent material powder to which electrolyte ions stick during charging in place of the active material powder 20.

Forming Aluminum Short Fibers by which a Current Collector is Constituted

The short fibers A of aluminum or copper have, for example, an average length of 25 mm, or preferably 20 mm or less, and an average diameter of 30 μm or less, or preferably 25 μm or less. The short fibers A of aluminum or copper is formed, for example, by chattering vibration cutting by making a cutting tool come into contact with an aluminum or copper columnar member having a circular cross section. It is also possible to use another method to form the aluminum or copper short fibers having the above-mentioned diameter and length. In some cases, the average diameter of the short fibers A may be 50 μm or less. The average length of the short fibers A may be 5 mm or less.

The short fibers A can also be made by using a coiled sheet shaving method. In the coiled sheet shaving method, a thin metal sheet made of aluminum or copper is rolled to a coiled state, and the axial end of the coiled sheet is cut by a cutting tool, which generates long fibers of aluminum or cupper having the aforementioned diameter. A bundle of the long fibers are pushed to a surface using a pushing member such as a plastic film, and then the long fibers are cut into the short fibers A having the aforementioned length. In another way, a bundle of the long fibers are inserted into a pipe-shaped member made of plastic or the like, and then the long fibers are cut into the short fibers A having the aforementioned length. The pushing member and the pipe-shaped member may be cut together with the long fibers.

Forming an Electrode

First, a liquid or gel slurry S is created. The liquid or gel slurry S contains the short fibers A of aluminum or copper, the active material powder 20 which chemically reacts during charging and discharging, the conductive additive 30, and the binder B. The slurry S is created by kneading a mixture of the short fibers A of aluminum or copper, the active material powder 20, the conductive additive 30, and the diluted binder B. Since the short fibers A of aluminum or copper are short fibers having a length of 25 mm or less, the short fibers A of aluminum or copper, the active material powder 20, and the conductive additive 30 are allowed to be mixed easily in the slurry S. When the average length of the short fibers A is 15 mm or less, or the average length thereof is 5 mm or less, the short fibers A of aluminum or copper, the active material powder 20, and the conductive additive 30 are allowed to be mixed more easily in the slurry S.

Subsequently, a pre-drying step is performed to increase the viscosity of the slurry S. The pre-drying is a process of drying the slurry S to a state where the binder B is not cured completely which thereby makes it easier to from the slurry S into a predetermined shape. The pre-drying step may be omitted in accordance with viscosity of the slurry S.

Figure 3:
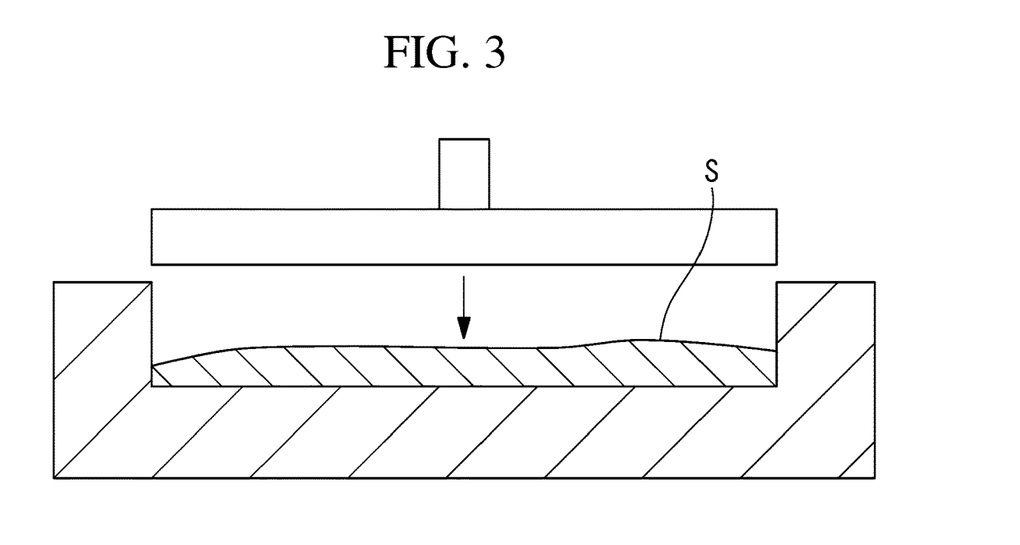
FIG. 3 is a schematic diagram of a method of forming the slurry into a predetermined shape in accordance with this embodiment.
Figure 4:
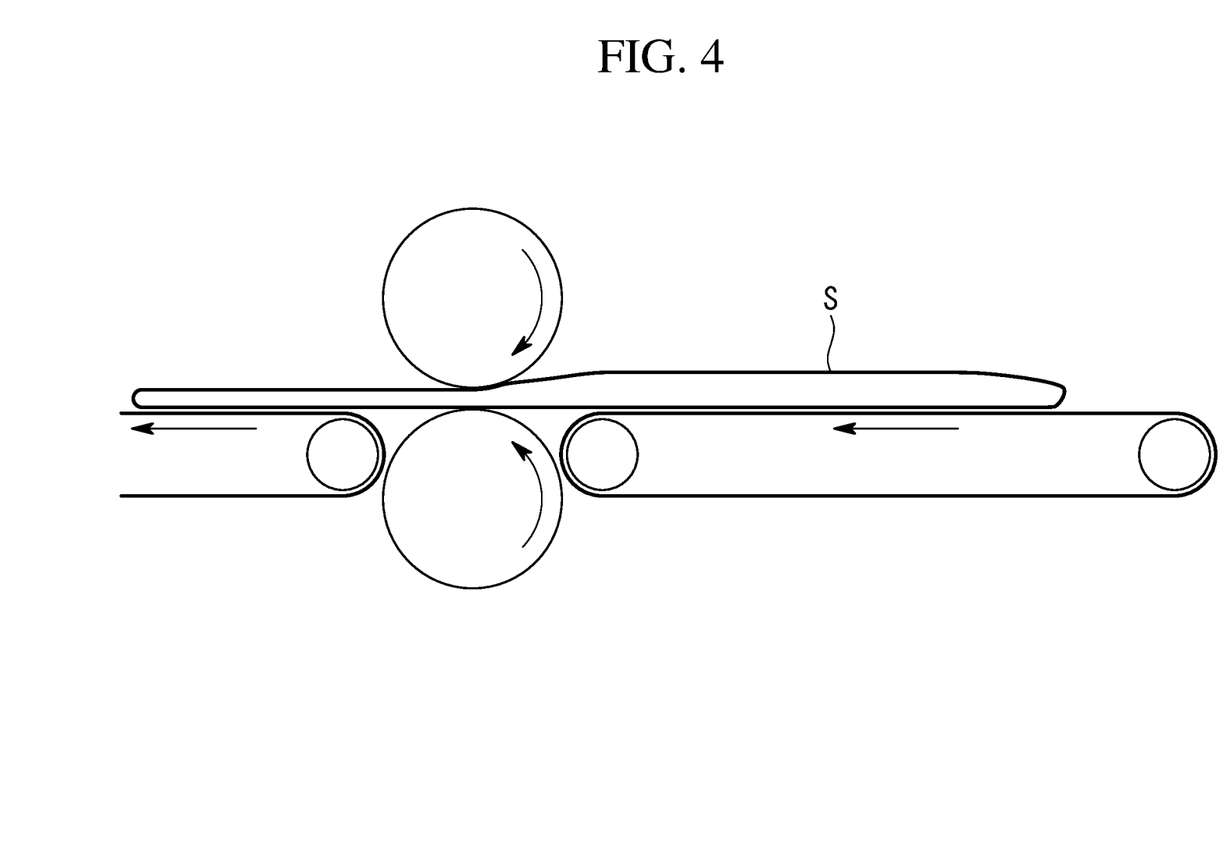
FIG. 4 is a schematic diagram of another method of forming the slurry into a predetermined shape in accordance with this embodiment.

Subsequently, the slurry S is put into a mold as illustrated in FIG. 3 in order to press the slurry S. As a result, the slurry S is formed such that it has a predetermined thickness in accordance with the size of the electrode. It should be noted that, as illustrated in FIG. 4, it is also possible to make the slurry S pass through the space between a pair or rollers to apply pressure to the slurry and thereby form the slurry S such that it has a predetermined thickness in accordance with the size of the electrode. If is also possible to cut the slurry S and form it into a predetermined shape (size) after adjusting the thickness of the slurry S by a mold or rollers.

Subsequently, a drying step using vacuum drying or the like is performed to dry the slurry S that has been formed. By this step, the binder B in the slurry S is cured and, by virtue of the binder B, the active material powder 20 and the conductive additive 30 in the slurry are retained by the short fibers A of the non-woven fabric current collector 10. After the slurry S is dried, the short fibers A are dispersed in the dried slurry S and the adjacent short fibers A come into direct contact with each other or the adjacent short fibers A are electrically connected through the active metal powder 20 or the conductive additive 30, which make the non-woven fiber current collector 10 in the slurry S with the dispersed short fibers A.

It should be noted that it is also possible to perform a pressurizing step to apply pressure to the non-woven fabric current collector 10 that has been subjected to the drying step. As the pressurizing step, it is possible to perform a process of passing the non-woven fabric current collector 10 through a space between a pair or rollers, a process of sandwiching the non-woven fabric current collector 10 by a pair of flat surfaces, or a process of applying pressure to the non-woven fabric current collector 10 by a mold, etc.

By using aluminum or copper, in particular by using aluminum preferably having a purity of 99.9% or more, more preferably a purity of 99.99% or more, it is made possible to cause two fibers A intersecting with each other to be deformed so as to bite into each other at a portion where the two fibers A are in contact with each other in such a manner that they intersect with each other by adjusting the pressurizing force at the time of pressurization of FIGS. 3 and 4 and pressurization of the non-woven fabric current collector 10 after the drying step. That is, the fibers A are flattened at the portion of contact, so that it appears that two intersecting fibers A bite into each other.

In this case, it is made possible to reduce the transfer resistance of electrons at the portion of contact of the fibers A, which is advantageous in terms or reduction in the resistance for electrons to move to the input/output terminals.

It should be noted that, instead of the slurry S containing the active material powder 20, it is also possible to create a slurry S that contains adsorbent material powder to which electrolyte ions stick during charging instead of the active material powder 20. In this case, the adsorbent material powder instead of the active material powder 20 will be retained on the short fibers A of the non-woven fabric current collector 10 after the drying step.

Active Material Powder

The active material powder 20 should be capable of being retained in the non-woven fabric current collector 10 by the binder B, etc. and should preferably be better in cycle characteristics. Examples of the active material include lithium cobaltate ($LiCoO_2$), iron phosphate-based active materials, and carbon materials such as graphite. It should be noted that it is also possible to use known active materials used in positive and negative electrodes of secondary batteries.

Adsorbent Material Powder

The above-described adsorbent material powder to be used in place of the active material powder 20 should be capable of being retained in the non-woven fabric current collector 10 by the binder B, etc. and should preferably be better in cycle characteristics. Examples of the adsorbent material powder include polyacene (PAS), polyaniline (PAN), activated carbon, carbon black, graphite, carbon nanotubes, etc. It should be noted that it is also possible to use known materials used in positive and negative electrodes of electric double layer capacitors.

It is preferable that the active material powder 20 and the adsorbent material powder are ground using a mortar, ball mill, vibratory ball mill, etc. so that the average particle size is preferably reduced to a predetermined value or less. As the predetermined value, it may be considered to use a value obtained by adding 10 μm to the average diameter of the short fibers A of the non-woven fabric current collector 10. For example, in a case where the average diameter of the short fibers A is 20 μm, it is preferable that the average particle size of the active material powder 20 and the adsorbent material powder be equal to or lower than 30 μm. By virtue of this, the area of contact between the short fibers A of the non-woven fabric current collector 10 and the active material powder 20 or the adsorbent material powder is increased, which will contribute to improvement of the charge and discharge speeds.

Binder

As the binder B, thermoplastic resins, polysaccharide polymer materials, etc. can be used. Examples of the materials for the binder include polyacrylic resin, polytetrafluoroethylene (PTFE), polyvinylidene fluoride (PVdF), copolymer of vinylidene fluoride (VdF) and hexafluoropropylene (HFP), etc. It should be noted that it is also possible to use known binders for use in electrodes of secondary batteries and electric double layer capacitors.

Conductive Additive

The conductive additive 30 should be a material having conductivity, and preferably a material that does not chemically change by an electrolyte or solvent. Examples of the conductive additive 30 include graphite and carbon black. It should be noted that it is also possible to use known conductive additives for use in electrodes of secondary batteries and electric double layer capacitors.

The electrode that has been created in the above-described manner can be used as an electrode of a power storage device including electric double layer capacitors, secondary batteries, hybrid capacitors including lithium ion capacitors, and the like. For example, it can be used in positive and negative electrodes of an electric double layer capacitor and, it can be used in positive and negative electrodes of a lithium ion rechargeable battery as an example of secondary batteries. It can also be used in positive and negative electrodes of a lithium ion capacitor. The example of application will be described later.

Figure 5:
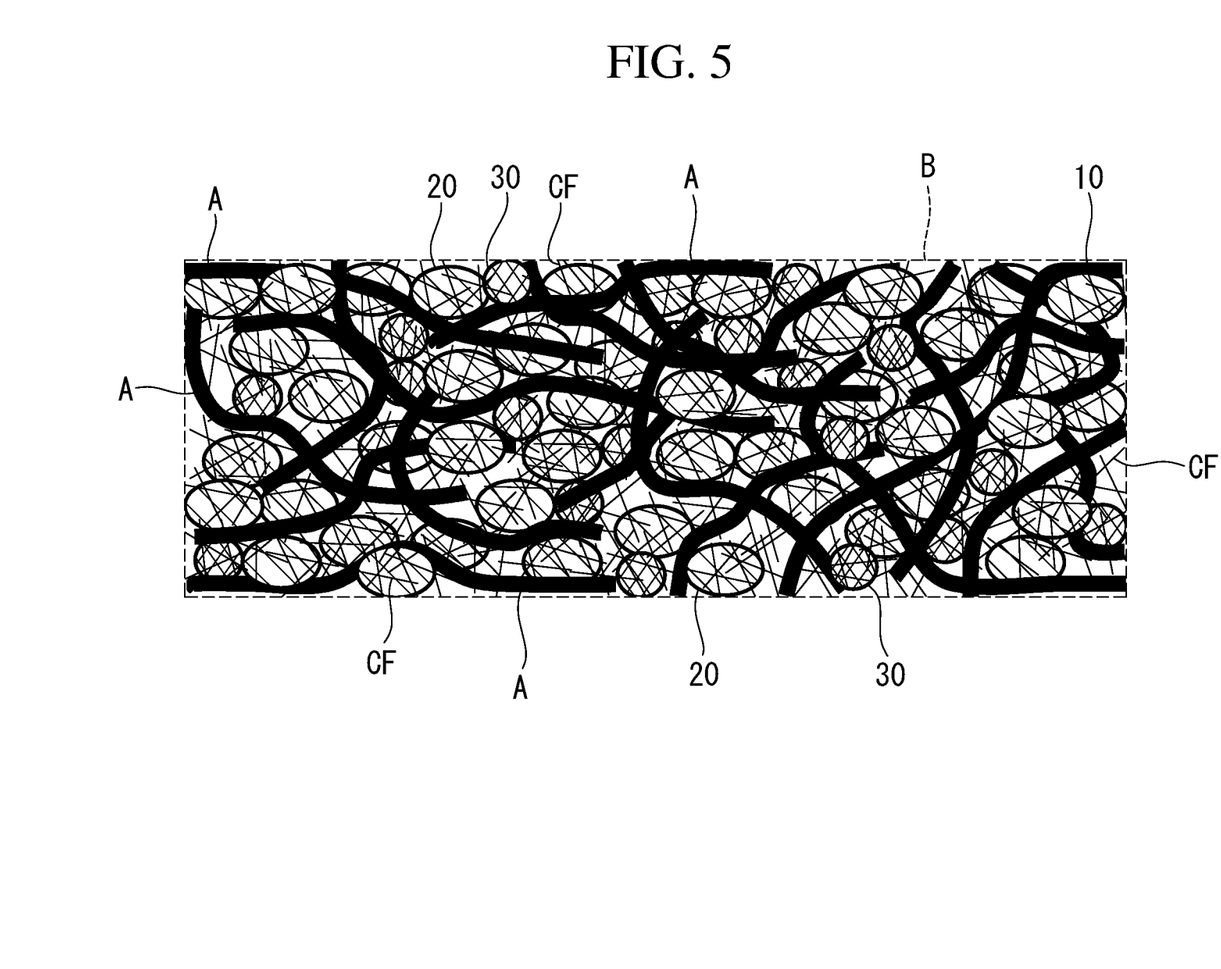
FIG. 5 is a cross-sectional diagram of an electrode in accordance with a first modified example of this embodiment.

It should be noted that, as the slurry S, it is also possible to use a slurry that contains powder of carbon fibers CF having an average thickness of 0.5 μm or less, preferably 0.3 μm or less in addition to the active material powder 20, the conductive additive 30, and the binder B. In this case, as illustrated in FIG. 5, the carbon fibers CF are arranged in the gap formed in the non-woven fabric current collector 10.

The carbon fibers CF are brought into contact with the short fibers A, the active material powder 20, the conductive additive 30, and other carbon fibers CF. In this embodiment, carbon fibers CF with an average thickness of 0.1 to 0.2 μm and a length in the order of 20 to 200 μm are used. It should be noted that the resistivity of the carbon fibers CF is, for example, $5 \times 10^{-5}$ Ω·cm while the resistivity of a carbon-based conductive additive 30 is 0.1 to 0.3 Ω·cm.

For example, even in a case where the active material powder 20 and the short fibers A are not brought into direct contact with each other, the active material powder 20 and the short fibers A are electrically connected to each other via the carbon fibers CF. Also, in a case where the active material powder 20 and the short fibers A are brought into direct contact with each other, by virtue of the presence of connection via the carbon fibers CF, the electrical resistance is further reduced between the active material powder 20 and the short fibers A.

In this manner, by virtue of the carbon fibers CF having good conductivity, it is made possible to reduce the transfer resistance of the electrons between the active material powder 20 and the short fibers A, which is advantageous in terms of reduction in the transfer resistance of electrons to move to the input and output terminals.

Figure 6:
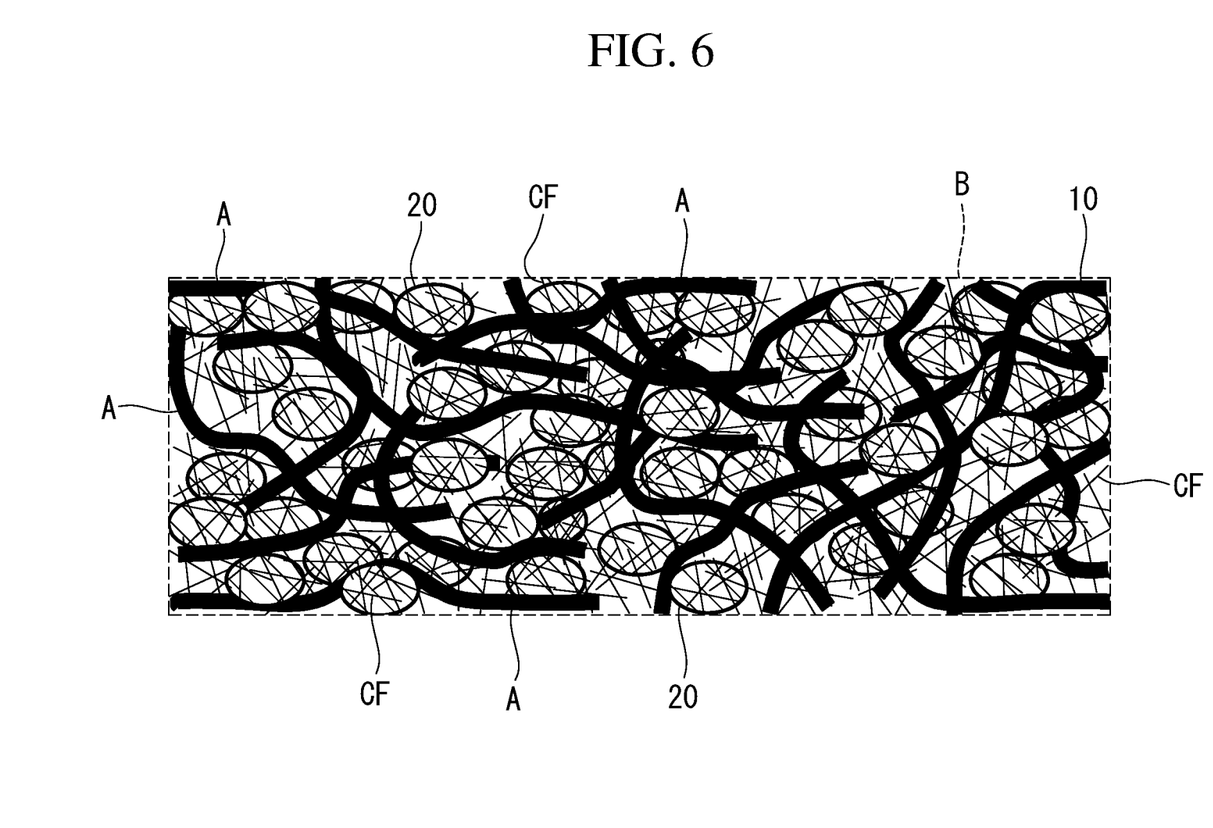
FIG. 6 is a cross-sectional diagram of an electrode in accordance with a second modified example of this embodiment.

It should be noted that it is also possible to manufacture an electrode using a slurry that does not contain the conductive additive 30 but contains the carbon fibers CF. In this case as well, as illustrated in FIG. 6, the carbon fibers CF are arranged in the gap formed in the non-woven fabric current collector 10. This configuration is advantageous in terms of reduction in the electrical resistance between the active material powder 20 and the short fibers A. It should be noted here that FIGS. 5 and 6 are diagrams for illustrating the configuration of this embodiment in a readily understandable manner, and the sizes, thicknesses, and lengths of the short fibers A, the active material powder 20, the conductive additive 30, the carbon fibers CF, and the like may differ from those of the actual ones.

It should be noted that, in order to efficiently realize reduction in the electrical resistance, the average length of the carbon fibers CF is preferably a half or more of the average particle sizes of the active material powder 20 and the adsorbent material powder, and more preferably two thirds or more of the average particle sizes.

Implementation on a Coin-Type Rechargeable Battery

Figure 7:
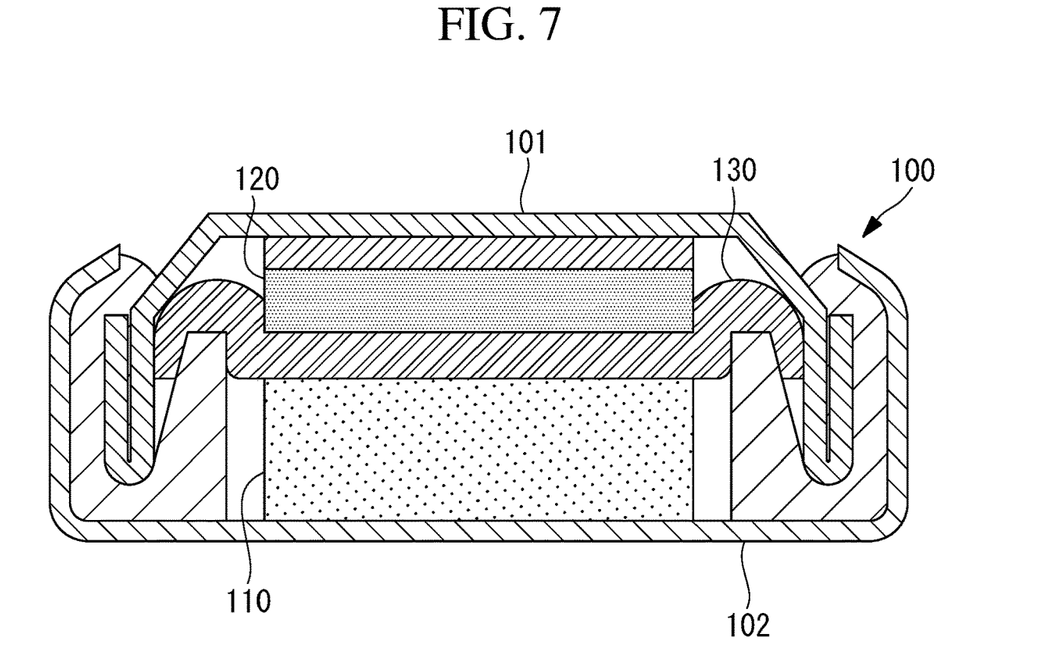
FIG. 7 is a cross-sectional view of a coin-type rechargeable battery using the electrode in accordance with this embodiment.

FIG. 7 illustrates an example of a coin-type rechargeable battery that uses the electrodes of this embodiment. The coin-type rechargeable battery includes a case (outer can) 100 having a case body 102 and a lid 101; and a power storage unit accommodated in the case 100. The power storage unit includes an electrode in which the short fibers A made of aluminum of this embodiment is used as the positive electrode 110. Also, it includes a negative electrode 120 facing the positive electrode 110, and a separator 130 arranged between the positive electrode 110 and the negative electrode 120. The positive electrode 110 is brought into surface contact with the case body 102, the negative electrode 120 is brought into surface contact with the lid 101, as a result of which the lid 101 and the case body 102 function as the input and output terminal of the positive electrode 110 and the negative electrode 120.

In this case, the active material powder 20 for the positive electrode is retained in the non-woven fabric current collector 10 used for the positive electrode 110. Also, the negative electrode 120 should have the structure and material of a known rechargeable battery negative electrode and, in the case of a lithium ion rechargeable battery, a carbon material such as graphite is used as the active material, and copper foil is used as the current collector. The separator 130 electrically insulates the positive electrode 110 and the negative electrode 120 from each other. The separator 130 should have ion permeability and resistance to oxidation and reduction on the surface of contact with the positive electrode 110 and the negative electrode 120. For example, it is possible to use porous polymers and inorganic materials, organic-inorganic hybrid materials, glass fibers, etc. It should be noted that known separators used in secondary batteries can also be used.

The inside of the case 100 accommodating the power storage unit is filled with an electrolytic solution. Lithium salt, potassium salt, sodium salt, magnesium salt, etc. can be used as electrolyte of electrolytic solution, and in the case of a lithium ion rechargeable battery, lithium salt is used. A non-aqueous solvent is used as the solvent in which the electrolyte dissolves, and ethylene carbonate, propylene carbonate, dimethyl carbonate, diethyl carbonate, carbonate ester, etc. can be used as the non-aqueous solvent. It should be noted that it is possible to use known electrolytes and solvents used in secondary batteries. Chemical reactions occur during charging and discharging, such as a chemical reaction in which ions such as lithium ions are released from the active material powder 20 of the positive electrode 110 into the electrolytic solution and a chemical reaction in which ions such as lithium ions are taken into the active material powder 20.

In a coin-type rechargeable battery configured in this manner, one surface in the thickness direction of the non-woven fabric current collector 10, which is used in the positive electrode 110, is brought into contact with the case body 102. Also, the non-woven fabric current collector 10 used in the positive electrode 110 is filled with the active material powder 20 such that the entire range thereof is filled with the active material powder 20 from the one surface to the other surface in its thickness direction, and numerous particles of the active material powder 20 are in contact with the short fibers A of the non-woven fabric current collector 10. As a result, the distance between the short fibers A and the active material powder 20 carrying the electrons to the input and output terminal is made shorter, which is advantageous in terms of improvement in the charge and discharge speeds.

Also, the active material powder 20 and the short fibers A are brought into direct contact with each other or the active material powder 20 and the short fibers A are arranged close to each other so that a current is allowed to flow therethrough via the conductive additive 30, etc. As a result, it is made possible to reduce the transfer resistance of electrons to move to the input and output terminal provided at an end or the like of the non-woven fabric current collector 10 when exchange of the electrons takes place between the active material powder 20 and the short fibers A.

It should be noted that an example of a conventional coin-type rechargeable battery is illustrated in FIG. 8. The coin-type rechargeable battery includes a positive electrode 140 which includes an aluminum-foil current collector 141 and an electrode layer 142 applied on one surface in the thickness direction of the current collector 141. The electrode layer 142 contains active material powder, a conductive additive, a binder, etc. Since only a limited space is available in a coin-type rechargeable battery, the amount of the active material powder in a conventional coin-type rechargeable battery is limited by the thickness of the current collector 141. Also, electrons of the active material powder arranged on the side of the separator 130 move to the current collector 141 via the active material powder and conductive additive arranged between the separator 130 and the current collector 141, so that this is not desirable in terms of improvement in the charge and discharge speeds.

It should be noted that, in the coin-type rechargeable battery, it is also possible to adopt the structure of the electrode of this embodiment as the negative electrode 120, in particular, an electrode in which short fibers A made of copper are used. In this case, a current collector of the electrode serves as the non-woven fabric current collector 10, carbon materials are used as the active material powder 20, and lithium titanate, titanium oxide, tungsten oxide, tin oxide, etc. may be used depending on the types of the batteries.

Implementation on a Laminated Rechargeable Battery

In the case of a rechargeable battery in which multiple power storage units including a positive electrode, a negative electrode, and a separator are laminated in the form of multiple layers, it is also possible to adopt, in the same manner as in the case of the coin-type rechargeable battery, the electrode structure that uses the short fibers A of aluminum or copper of this embodiment, in only the positive electrode, only the negative electrode, or for both of the positive electrode and the negative electrode.

Implementation on an Electric Double Layer Capacitor

Figure 9:
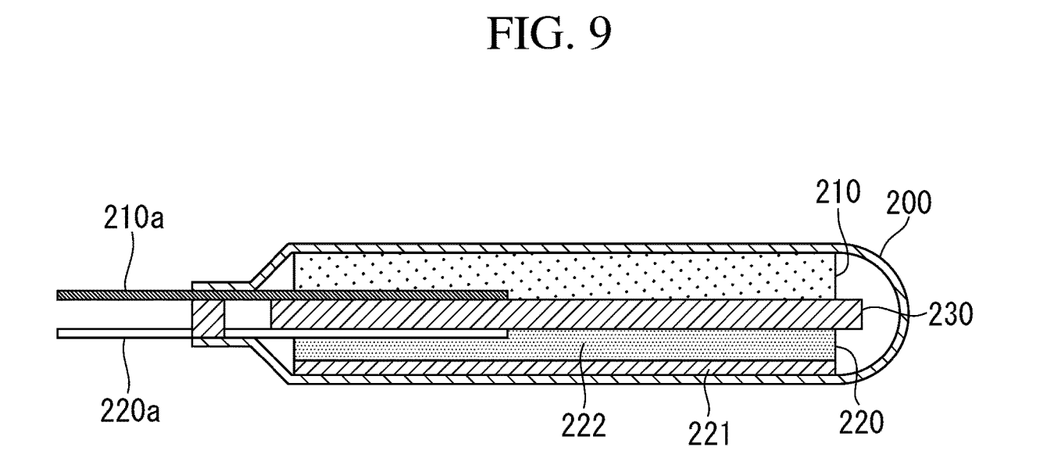
FIG. 9 is a cross-sectional view of an electric double layer capacitor using the electrode in accordance with this embodiment.

FIG. 9 illustrates an example of an electric double layer capacitor in which the electrode of this embodiment is used. The electric double layer capacitor includes, for example, a container 200 and a power storage unit accommodated in the container 200. The power storage unit includes, as the positive electrode 210, an electrode in which the aluminum short fibers A of this embodiment are used. Also, it includes a negative electrode 220 facing the positive electrode 210 and a separator 230 arranged between the positive electrode 210 and the negative electrode 220. The positive electrode input and output terminal 210a is connected to the positive electrode 210, and the negative electrode input and output terminal 220a is connected in a similar manner to the negative electrode 220, and the respective input and output terminals extend to the outside of the container 200.

In this case, adsorbent material powder is retained in the non-woven fabric current collector 10 used in the positive electrode 210. Also, the negative electrode 220 should have the structure and material of a negative electrode of a known electric double layer capacitor and, for example, it has a current collector 221 made of aluminum foil and an electrode layer 222 applied on one surface in the thickness direction of the current collector. The electrode layer 222 contains adsorbent material powder, a conductive additive, a binder, etc.

The separator 230 electrically insulates the positive electrode 210 and the negative electrode 220 from each other. The separator 230 should have ion permeability and resistance to oxidation and reduction on the surface of contact with the positive electrode 210 and the negative electrode 220. For example, it is possible to use porous polymers and inorganic materials, organic-inorganic hybrid materials, glass fibers, etc. It should be noted that known separators used in electric double layer capacitors can also be used.

The inside of the container 200 accommodating the power storage unit is filled with an electrolytic solution. The electrolytic solution contains a non-aqueous solvent and an electrolyte. The electrolyte and the non-aqueous solvent should be known substances used in electric double layer capacitors. As the electrolyte, it is possible to use, for example, ammonium salt, phosphonium salt, etc. As the non-aqueous solvent, it is possible to use, for example, cyclic carbonate, chain carbonate, cyclic ester, chain ester, cyclic ether, chain ether, nitriles, sulfur containing compounds, etc.

In this electric double layer capacitor, an end of the non-woven fabric current collector 10 used in the positive electrode 210 is connected to the positive electrode input and output terminal 210a. Also, the non-woven fabric current collector 10 used in the positive electrode 210 is filled with the adsorbent material powder such that the entire range thereof is filled with the adsorbent material powder from the one surface to the other surface in its thickness direction, and numerous particles of the adsorbent material powder are in contact with the short fibers A of the non-woven fabric current collector 10.

As a result, the distance between the short fibers A and the adsorbent material powder carrying the electrons to the positive electrode input and output terminal 210a is made shorter, which is advantageous in terms of improvement of the charge and discharge speeds. The above-described advantage will be readily appreciated when compared with the negative electrode 220, for the structure of the conventional positive electrode is identical with the negative electrode 220. It should be noted that, in the electric double layer capacitor, it is also possible to adopt the structure of the electrode in which the aluminum short fibers A of this embodiment are used as the negative electrode 220. Also, it is possible to adopt the structure of the electrode in which the copper short fibers A of this embodiment are used in the positive electrode 210 and the negative electrode 220.

According to this embodiment, it is made possible to form an electrode for a power storage device in which the active material powder 20 and the adsorbent material powder are arranged close to the short fibers A of high-purity aluminum or copper short fibers A as described above. By virtue of this, it is made possible to manufacture a power storage device that has a higher capacity and lower deformation resistance and excels in charge and discharge characteristics.

Also, for example, manufacturing of aluminum foil for use in conventional capacitors and secondary batteries is realized by creating a very large square pillar aluminum ingot called slab, cutting and heating it, rolling it for multiple times, and performing surface treatment thereon. As a result, it requires a lot of energy and costs. Meanwhile, the short fibers A of aluminum or copper used in this embodiment can be manufactured by chattering vibration cutting or the like. Also, when the non-woven fabric current collector 10 that retains the adsorbent material powder, the active material powder 20, the conductive additive 30, and the like is rolled to form a foil sheet, the press pressure can also be reduced. As a result, it is made possible to eliminate the need of large-sized equipment and readily and cost-effectively manufacture current collector foil and positive electrode foil.

As has been described in the foregoing, according to this embodiment, when the slurry formed into a predetermined shape is dried, the short fibers A of aluminum or copper are electrically connected to each other, and the non-woven fabric current collector 10 is formed by the short fibers A of aluminum or copper. Also, since the short fibers A of aluminum or copper and the adsorbent material powder or the active material powder 20 are mixed in the slurry S, the adsorbent material powder or the active material powder 20 enters the gap formed between the short fibers A of the non-woven fabric current collector 10 when the slurry S is dried. As a result, the adsorbent material powder or the active material powder 20 is brought into direct contact with the short fibers A, or arranged close to the short fibers A, so that it is made possible to reduce the transfer resistance of electrons when exchange of the electrons takes place between the adsorbent material powder or the active material powder 20 and the short fibers A.

Also, since the carbon fibers CF are mixed in the slurry S, even in a case where the adsorbent material powder or the active material powder 20 and the short fibers A are not brought into direct contact with each other when the electrode is formed, the adsorbent material powder or the active material powder 20 is electrically connected to the short fibers A via the carbon fibers CF. Also, in a case where the adsorbent material powder or the active material powder 20 and the short fibers A are brought into direct contact with each other, by virtue of the presence of connection via the carbon fibers, it is made possible to further reduce the electrical resistance between the adsorbent material powder or the active material powder 20 and the short fibers A.

The aforementioned embodiments are made, for example, in the following circumstances.

In recent years, development of capacitors for use in power devices including electric-powered vehicles, energy generation, and the like has been advanced. In order to put a large amount of energy into and out of a capacitor with high efficiency, a method is conceivable with which the capacitance is increased and the internal resistance of the electrode section is reduced. In a simplified way, a method is conceivable with which the distance between the activated carbon and the aluminum member which is the current collector is reduced and activated carbon is arranged as much as possible.

In general, an electric double layer capacitor differs from a rechargeable battery, which is typically a lithium ion rechargeable battery, in that electrical charge of the former is reduced with the passage of time by self-discharge without chemical reaction, its storage time is short, and its current discharge time is short. In addition, with regard to energy density, an electric double layer capacitor has an energy density of several tens Wh/L but lithium battery has an energy density of several hundred Wh/L. It is because of the aforementioned difference that electric double layer capacitors are considered not for storage but for backup power sources for electrical components, energy for starting idling stop systems, brake control, power assistance, and the like.

Since secondary batteries, a typical example of which is a lithium battery, have relatively high energy density and can be used for a long time, they are used in various fields including portable devices. Also, in recent years, they are used in automobiles, heavy machinery, energy field, etc. However, many problems still exist in terms of their performance (capacity, charge and discharge speeds, and life) and manufacturing costs, which are in particular conspicuous in large batteries such as those for use in automobiles. For example, although the current used in mobile phones is in the order of several milliamperes (mA), the current used in hybrid vehicles is in the order of several hundred amperes (A), and the latter is 10000 or more times as large as the former. Consequently, although it is necessary to increase the size in order to increase the capacity, there are many challenges such as capacity, charging speed, reliability, difficulty of manufacturing, and the like, which should be addressed to achieve the increase in the size.

The reaction of a lithium ion rechargeable battery is a reversible chemical reaction and the volume of the active material expands and contracts as the electrode is charged and discharged. Accordingly, the active material is detached from the current collector and the charge and discharge characteristics deteriorate. That is, the same 100% charging/discharging does not always occur and drop in the charging/discharging capacity may occur. Since batteries are used for many years in hybrid vehicles and electric-powered vehicles, it is necessary to suppress the detachment of the active material from the current collector in order to prevent the above-mentioned deterioration.

In addition, internal resistance is the biggest problem of lithium ion batteries. The internal resistance can be said to be the resistance at the time of the lithium ions moving in the electrolyte between the positive electrode and the negative electrode in the battery. The transfer resistance is the major culprit hindering increase in the capacity or improvement in the charge and discharge speeds.

When a large amount of active material is applied to the current collector for the purpose of increase in the size, the capacity is in effect increased but the transfer resistance is also increased. Therefore, there is a ceiling on the thickness at present. In addition, the charge and discharge speeds are decreased by the resistance. When the coating thickness is reduced, the internal resistance is reduced and the charge and discharge speeds are increased, but the capacity is reduced. Therefore, current collectors on which the active material is applied need to be stacked in multiple layers, or the area of the current collector on which the active material is applied needs to be increased.

The speeds of charging and discharging may also be affected by the amount of lithium ions generated. If many ions are generated at once and can be moved at once, then the charge speed and the discharge speed will be increased. Since the chemical reaction of the rechargeable battery occurs at the interface with the electrolyte, the charge and discharge speeds will also be improved if the contact area between the electrode and the electrolyte can be increased.

In order to reduce the internal resistance, improvements have been made, which include improvement of additive substances, improvement of conductive additive and active materials, and applying carbon particles of fine grain on a current collector in advance. Further, with regard to the shape of the current collector, improvements have been made to make the film as thin as possible as described above, and to form small holes or the like in the foil to increase the surface area. In addition, in the electric double layer capacitors, research and development have also been made to improve activated carbon and additives, increase the contact area with a current collector, and the like.

As discussed above, in electric double layer capacitors which is a power storage device and secondary batteries such as lithium ion secondary batteries, efforts have been made to realize large capacity, high power, long life, and cost reduction, for electric-powered vehicles, hybrid vehicles, and high-power energy devices.

The following aspects are at least partially beneficial to the aforementioned circumstances.

A method of manufacturing an electrode of an power storage device in accordance with a first aspect of the present invention includes creating a liquid or gel slurry, the slurry containing short fibers of aluminum or copper, adsorbent material powder on which electrolyte ions are adsorbed during charging or active material powder which chemically reacts during charging or discharging, and a binder; forming the slurry into a predetermined shape; and drying the slurry formed into the predetermined shape so as to form an electrode in which the short fibers of aluminum or copper functions as a current collector.

According to this aspect, when the slurry that has been formed into the predetermined shape is dried, then the short fibers of aluminum or copper are electrically connected to each other, and a non-woven fabric current collector is formed by the short fibers. Also, since the short fibers are mixed with the adsorbent material powder or the active material powder in the slurry, the adsorbent material powder or the active material powder exists in the gap formed between the short fibers of the non-woven fabric current collector when the slurry is dried. As a result, the adsorbent material powder or the active material powder is brought into direct contact with the short fibers or arranged near the short fibers, which makes it possible to reduce the transfer resistance of electrons when exchange of the electrons takes place between the adsorbent material powder or the active material powder and the short fibers of aluminum or copper.

In the slurry creation step in accordance with the above-described aspect, it is also possible to create the slurry that contains the short fibers of aluminum or copper, the adsorbent material powder or the active material powder, the binder, and carbon fibers having an average thickness of 0.5 µm or less.

In this case, even when the adsorbent material powder or the active material powder is not in direct contact with the short fibers which form the electrode, the adsorbent material powder or the active material powder is electrically connected to the short fibers via the carbon fibers. Also, even when the adsorbent material powder or the active material powder is in direct contact with the short fibers, by virtue of the presence of the connection via the carbon fibers, the electrical resistance is further reduced between the adsorbent material powder or the active material powder and the short fibers.

Also, in the above-described aspect, it is also possible to perform, prior to the forming step, a pre-drying step of drying the slurry to a state where the binder is not completely cured. In this case, the slurry before the forming step can be more readily formed, which is advantageous in terms of achieving improvement in the quality of the electrode to be manufactured and reduction in the manufacturing cost thereof.

An electrode of a power storage device in accordance with a second aspect of the present invention includes a non-woven fabric current collector composed of short fibers of aluminum or copper with an average length of 25 mm or less and adsorbent material powder on which electrolyte ions adsorb during charging or active material powder which chemically reacts during charging or discharging, the powder entering gaps formed between the short fibers of the aluminum or copper of the non-woven fabric current collector.

According to this aspect, since the adsorbent material powder or the active material powder enters and remains in the gaps formed between the short fibers of the non-woven fabric current collector, the adsorbent material powder or the active material powder is brought into direct contact with the short fibers or arranged near the short fibers, which makes it possible to reduce the transfer resistance of electrons when exchange of electrons takes place between the adsorbent material powder or the active material powder and the individual short fibers of aluminum or copper.

In the context of the above-described aspect, carbon fibers entering the gap in the non-woven fabric current collector and having an average thickness of 0.5 μm or less may be further provided.

In this case, even when the adsorbent material powder or the active material powder is not in direct contact with the short fibers, the adsorbent material powder or the active material powder is electrically connected to the short fibers via the carbon fibers. Also, even when the adsorbent material powder or the active material powder is in direct contact with the short fibers, by virtue of the presence of the connection via the carbon fibers, the electrical resistance can be further reduced between the adsorbent material powder or the active material powder and the short fibers.

In the context of the above-described aspect, the non-woven fabric current collector may have at least one portion at which two of the short fibers of the aluminum or copper are in contact with each other in such a manner that the two short fibers intersect with each other, and the two aluminum or copper fibers may bite into each other at the portion of the intersection.

In this case, electron transfer resistance at the contact point between the short fibers can be reduced, which is advantageous in terms or reduction in the transfer resistance of electrons to move to the input and output terminal.

Also, in the context of the above-described aspect, it is preferable to use aluminum with a purity of 99.9% or more as the above-mentioned aluminum.

According to the above aspects, the charge and discharge speeds of the power storage device can be improved.

REFERENCE SIGNS LIST

10 non-woven fabric current collector
20 active material powder
30 conductive additive
A aluminum or copper short fibers
B binder
S slurry
CF carbon fibers

What is claimed is:
1. A method of manufacturing an electrode for a power storage device, the method comprising:
   making long fibers by cutting, by means of a cutting tool, an axial end of a coiled metal sheet made of aluminum or copper;
   making short fibers made of aluminum or copper by cutting the long fibers; making a liquid or gel slurry, the slurry containing the short fibers of aluminum or copper, a material powder, and a binder, the material powder being either an adsorbent material powder on which electrolyte ions are adsorbed during charging or an active material powder which chemically reacts during charging or discharging;
   forming the slurry into a predetermined shape; and drying the slurry formed into the predetermined shape so as to form an electrode, wherein the short fibers have an average diameter of equal to or more than 20 μm and equal to or less than 30 μm,
   and wherein, when cutting the long fibers, the long fibers are pushed to a surface using a pushing member, and the long fibers are cut to make the short fibers together with the pushing member.

2. The method of manufacturing the electrode according to claim 1, wherein, when making the slurry, the slurry is made to contain the short fibers of aluminum or copper, the adsorbent material powder or the active material powder, the binder, and carbon fibers having an average diameter of 0.5 μm or less.

3. The method of manufacturing the electrode according to claim 1, wherein the short fibers are made of aluminum with a purity of 99.9% or more.

4. The method of manufacturing the electrode according to claim 1, further comprising, prior to forming the slurry, pre-drying the slurry to a state where the binder is not completely cured.

5. An electrode for a power storage device, the electrode comprising:
   a fabric current collector composed of short fibers of aluminum, the short fibers being made by cutting long fibers so that its average length becomes 25 mm or less and the long fibers being made by cutting an axial end of a coiled metal sheet made of aluminum;
   a material powder, the material powder being either an adsorbent material powder on which electrolyte ions are adsorbed during charging or an active material powder which chemically reacts during charging or discharging, wherein the material powder exists in a gap formed between the short fibers of the aluminum of the fabric current collector; and
   carbon fibers which exist in the gap of the fabric current collector and having an average diameter of 0.5 μm or less,
   wherein an average size of the adsorbent material powder or the active material powder is 10 μm greater than the average diameter of the short fibers of aluminum or copper.

6. The electrode according to claim 5, wherein the fabric current collector has at least one portion at which two of the short fibers of the aluminum or copper are in contact with each other such that the two short fibers intersect with each other and the two aluminum or copper fibers bite each other at the portion of the intersection.

7. The electrode according to claim 5, wherein the short fibers are made of aluminum having a purity of 99.9% or more.

8. The method of manufacturing the electrode according to claim 1, wherein an average size of the adsorbent material powder or the active material powder is 10 µm greater than the average diameter of the short fibers of aluminum or copper.

9. The method of manufacturing the electrode according to claim 2, wherein an average length of the carbon fibers is a half of or more of an average particle size of the adsorbent material powder or the active material powder.

10. The method of manufacturing the electrode according to claim 1, wherein an average length of the short fibers is more than 1 mm.

11. The electrode according to claim 5, wherein an average length of the carbon fibers is a half of or more of an average particle size of the adsorbent material powder or the active material powder.

12. An electrode for a power storage device, the electrode comprising:
   a fabric current collector composed of short fibers of aluminum or copper with an average length of 25 mm or less; and
   a material powder being either an adsorbent material powder or an active material powder, the adsorbent material powder adsorbing electrolyte ions during charging, the active material powder chemically reacting during charging and discharging, wherein the material powder exists in a gap formed between the short fibers of the aluminum or copper of the fabric current collector,
   wherein an average size of the adsorbent material powder or active material powder is 10 µm greater than the average diameter of the short fibers of aluminum or copper.

13. A method of manufacturing an electrode for a power storage device, the method comprising:
   making a liquid or gel slurry, the slurry containing short fibers of aluminum or copper, a material powder, and a binder, the material powder being either an adsorbent material powder or an active material powder, the adsorbent material powder adsorbing electrolyte ions during charging, the active material powder chemically reacting during charging and discharging;
   forming the slurry into a predetermined shape; and
   drying the slurry formed into the predetermined shape so as to form an electrode,
   wherein an average size of the adsorbent material powder or active material powder is 10 µm greater than the average diameter of the short fibers of aluminum or copper.

14. A method of manufacturing an electrode for a power storage device, the method comprising:
   making long fibers by cutting, by means of a cutting tool, an axial end of a coiled metal sheet made of aluminum or copper;
   making short fibers made of aluminum or copper by cutting the long fibers;
   making a liquid or gel slurry, the slurry containing the short fibers of aluminum or copper, a material powder, and a binder, the material powder being either an adsorbent material powder on which electrolyte ions are adsorbed during charging or an active material powder which chemically reacts during charging or discharging;
   forming the slurry into a predetermined shape; and
   drying the slurry formed into the predetermined shape so as to form an electrode,
   wherein the short fibers have an average diameter of equal to or more than 20 µm and equal to or less than 30 µm,
   wherein, when cutting the long fibers, the long fibers are inserted into a pipe-shaped member, and the long fibers are cut to make the short fibers together with the pipe-shaped member.

* * * * *